United States Patent
Owa

[11] Patent Number: 5,875,031
[45] Date of Patent: Feb. 23, 1999

[54] DISTANCE MEASURING DEVICE BASED ON LASER INTERFERENCE WITH A BAFFLE STRUCTURE MEMBER

[75] Inventor: Soichi Owa, Tokyo, Japan

[73] Assignee: Nikon Corporation, Japan

[21] Appl. No.: 972,161

[22] Filed: Nov. 17, 1997

Related U.S. Application Data

[63] Continuation of Ser. No. 839,612, Apr. 15, 1997, abandoned, which is a continuation of Ser. No. 527,144, Sep. 12, 1995, abandoned.

[30] Foreign Application Priority Data

Sep. 13, 1994 [JP] Japan .................................. 6-243453

[51] Int. Cl.[6] .................................................... G01B 9/02
[52] U.S. Cl. .......................................................... 356/358
[58] Field of Search .................................. 356/358, 363, 356/401, 345; 355/53

[56] References Cited

U.S. PATENT DOCUMENTS

| | | | |
|---|---|---|---|
| 4,278,352 | 7/1981 | Keller | 356/358 |
| 5,469,260 | 11/1995 | Takagi et al. | 356/358 |
| 5,550,633 | 8/1996 | Kamiya | 356/358 |
| 5,552,888 | 9/1996 | Sogand et al. | 356/358 |

FOREIGN PATENT DOCUMENTS

| | | |
|---|---|---|
| 61-293756 | 12/1986 | Japan . |
| 2098637 | 5/1987 | Japan ................................... 356/358 |
| 62-98637 | 5/1987 | Japan . |
| 63-200090 | 8/1988 | Japan . |
| 1-18002 | 1/1989 | Japan . |
| 1-274002 | 11/1989 | Japan . |
| 0001505 | 1/1990 | Japan ................................... 356/358 |
| 2-199814 | 8/1990 | Japan . |
| 3-97216 | 4/1991 | Japan . |
| 3-129720 | 6/1991 | Japan . |
| 3-160304 | 7/1991 | Japan . |
| 3-180703 | 8/1991 | Japan . |
| 4-20803 | 1/1992 | Japan . |

OTHER PUBLICATIONS

Koten Butsuri–Gaku Mar. 1975 (w/English Abstract).

HP Laser Interferometry, Section II, pp. 2–1 to 2–8, HP5527A.

*Primary Examiner*—Samuel A. Turner
*Attorney, Agent, or Firm*—Pennie & Edmonds LLP

[57] ABSTRACT

A distance measuring device based on laser interference reduces measurement errors caused by irregular air currents and the like on the measurement optical path, and realizes a high throughput and a high integration degree. The distance measuring device based on laser interference according to this invention includes a baffle structure member for causing a gas on the measurement optical path to flow as a laminar flow in a predetermined direction.

11 Claims, 6 Drawing Sheets

DISTANCE MEASURING DEVICE BASED ON LASER INTERFERENCE WITH A BAFFLE STRUCTURE MEMBER

This is a continuation of application No. 08/839,612, filed Apr. 15, 1997, which is a continuation application Ser. No. of 08/527,144, filed Sep. 12, 1995, both now abandoned.

BACKGROUND OF THE INVENTION

1. Field of the Invention

The present invention relates to a distance measuring device based on laser interference, which is used to perform distance measurement with high precision.

2. Related Background Art

A distance measuring device based on laser interference uses a laser source (coherent light beam) having a long coherence length and measures a distance by using interference of light. In general, this device has high measurement precision and hence has been used for high-precision distance measurement in various cases.

In an exposure apparatus (so-called stepper or the like) used for the manufacture of semiconductor elements, before exposure is performed, a circuit pattern (its projection image) on a mask and a circuit pattern on a semiconductor wafer must be superimposed on each other with high precision. This superimposition is generally performed by moving a moving stage holding the semiconductor wafer with respect to the mask. In order to increase the superimposition precision, therefore, it is important to position the moving stage with high precision.

Such high-precision positioning (or position measurement) of the moving stage is performed by using a distance measuring device based on laser interference. In general, an object such as a reflecting mirror is fixed on one end of the moving stage, and a laser beam from the light source is irradiated on the object to measure its position.

When a device based on double-beam interference is to be used, a light beam from a light source is split into a reference beam and a measurement beam by a beam splitter (half mirror). The measurement beam is irradiated on the object on the moving stage, and is returned to the beam splitter. The measurement beam is then caused to interfere with the reference beam having propagated through another optical path. The resultant pattern of interference fringes corresponds to the optical path length difference (phase difference) between the two light beams.

When, therefore, the position of the moving stage, i.e., the position of the object, changes, the optical path length difference between the two light beams fluctuates. The pattern of interference fringes therefore changes. According to the principle of interference, every time the position of the moving state moves by a distance corresponding to ½ the wavelength of a light beam, the dark and light portions of the interference fringes change to light and dark portions, respectively. Position measurement can be performed by obtaining the number of changes in the light and dark portions of the interference fringes.

The positioning precisions of currently available distance measuring devices based on laser interference are about 10 nm. However, with demands for higher LSI integration degrees, a further increase in precision is required.

SUMMARY OF THE INVENTION

According to the present invention, a distance measuring device based on laser interference, which measures a distance to an object by irradiating a laser beam along a measurement optical path in a gas, is characterized by including a baffle structure member for causing the gas to flow as a laminar flow in a predetermined direction with respect to the measurement optical path.

The baffle structure member preferably includes a cylindrical member which coaxially surrounds the measurement optical path.

The cylindrical member is preferably designed such that its dimension is expandable in the axial direction of the measurement optical path.

The cylindrical member preferably has an air current inlet portion in one end portion, and an air current outlet portion in the other end portion. In addition, the cylindrical member includes an air supply unit for forcibly supplying an air current to the air current inlet portion.

The baffle structure member preferably includes a pair of flat plates for forming a parallel gap, and the measurement optical path preferably extends through the parallel gap. In this case, the flat plates are preferably designed such that their dimension is expandable in the axial direction of the measurement optical path.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1:
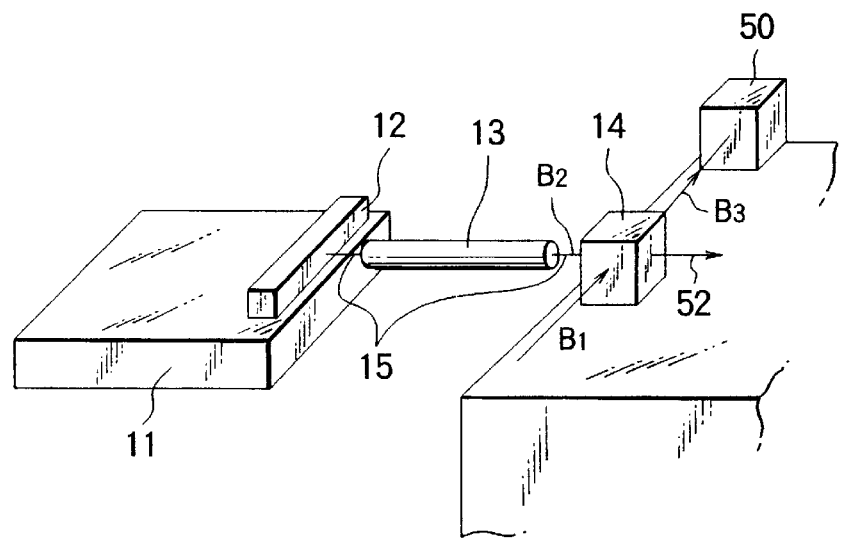
FIG. 1 is a perspective view showing the schematic arrangement of a distance measuring device based on laser interference according to the first embodiment of the present invention, which is incorporated in an exposure apparatus used for the manufacture of semiconductor elements.

A stepper or the like is generally arranged in an air-conditioned chamber because the temperature of the overall apparatus must be controlled to be constant. The chamber is filled with a predetermined gas, and the gas is circulated by an air-conditioning means at a predetermined air flow. Since a distance measuring device based on laser interference is also arranged in the chamber, a measurement beam must pass through a flow of the gas (air current) to measure the position of a moving stage with high precision.

In general, in length measurement using light in a gas instead of a vacuum, the actually measured amount is an amount represented by the optical path length (optical distance), i.e., the product of a spatial distance d and a gas refractive index n. Even if, therefore, a desired spatial distance d is maintained, the optical length as the measured amount fluctuates as the gas refractive index n fluctuates. In this case, the gas refractive index n is a quantity dependent on environmental parameters such as the temperature, pressure (or density), humidity, and the like of the gas, fluctuations in the gas refractive index n (i.e., fluctuations in optical path length) on the measurement optical path may be considered as fluctuations caused by fluctuations in environmental parameters.

A temperature fluctuation can be exemplified as a main environmental parameter fluctuation. In addition to a laser source for an interferometer, there are many heat sources such as a motor for driving the stage and an exposure light source in the chamber. For this reason, masses of gas which have different temperatures are inevitably present locally. If such a gas having a nonuniform refractive index distribution (refractive index irregularity) flows with a wind (air current) from the air-conditioning means to cross the measurement optical path irregularly (randomly) in terms of time, the optical path length fluctuates.

When fluctuations in optical path length were actually measured while the spatial distance d was kept constant, it was found that the measured optical path length increased/decreased (errors occurred) by about 20 nm at a period of about 10 sec. Since the position of the moving stage in the stepper is generally measured within a short period of time (about 0.01 sec) as compared with the fluctuation period of the optical path length, the above fluctuation width of the optical path length directly becomes a measurement error.

The positioning precision in the state-of-art techniques is about 10 nm. In order to increase the positioning precision in this situation, fluctuations in optical path length may be averaged to some extent by prolonging the measurement time. With the prolongation of the measurement time, however, the throughput in the manufacture of semiconductor elements decreases. A higher throughput is an important theme which is indispensable to achieve a higher integration degree. Demands therefore have arisen for a method of increasing the positioning precision without decreasing the throughput.

This method can be realized by decreasing the fluctuation width of the optical path length due to environmental factors, which directly becomes a measurement error. If the fluctuation width of the optical path length can be decreased, not only the positioning precision increases, but also the position measurement time can be shortened. The throughput therefore can also be increased. As such techniques, the following two methods have been proposed and practiced.

Firstly, for example, the invention disclosed in Japanese Patent Laid-Open No. 63-200090 is available as a technique of eliminating the irregularity of (spatially equalizing) the refractive index of a gas on the measurement optical path. According to this invention, in consideration of the fact that the main cause of refractive index irregularity is temperature irregularity, spatial temperature irregularity on the measurement optical path is eliminated by blowing a temperature-stabilized gas onto the optical path at a predetermined velocity.

Secondly, for example, the invention disclosed in Japanese Patent Laid-Open No. 62-98637 is available as a technique of preventing the refractive index irregularity of a gas from crossing the measurement optical path. According to this invention, an optical path cover is arranged on the measurement optical path to prevent an ambient gas with refractive index irregularity from reaching the measurement optical path with an air current. That is, the invention is designed to prevent almost any gas flow in the optical path cover.

Another method has been proposed as another approach. In this method, fluctuations in optical path length are detected by another method, and correction is made afterward on the basis of the detected fluctuations.

When a temperature-stabilized gas is to be blown onto a measurement optical path as in the first technique, a new air-conditioning means for this purpose is required. Consequently, the distance measuring device based on laser interference increases in size and cost.

As described above, an air current produced by the air-conditioning means is present on the measurement optical path. Although the average flow velocity of this air current is low (about 30 cm/s), since the size of the space of the measurement optical path is not particularly limited and has a spread of about several 10 cm, the air current on the optical path is expected to become an irregular flow, i.e., a turbulent flow. For this reason, the gas blown from the air-conditioning means onto the measurement optical path may become a turbulent flow as well.

If the temperature of the gas is stabilized as in this technique, no refractive index irregularity is caused by temperature irregularity. A refractive index, however, is an amount which is dependent on not only temperature but also other environmental parameters such as pressure, composition, and water vapor pressure (or humidity). That is, even if the temperature of a gas is kept constant, inconstant parameters are left. If the refractive index irregularity based on such inconstant pressure and density irregularly changes because of a turbulent flow on the optical path, a new error occurs. For this reason, the above technique does not provide a sufficient effect of decreasing the fluctuation width of the optical path length.

The optical path cover in the second technique is designed to only block an air current. That is, the cover is expected to block an external air current so as to prevent almost any flow of a gas on the measurement optical path surrounded by the optical path cover.

In the second technique, however, the measurement optical path is not completely sealed. In practice, since a high-precision reflecting mirror is used as an object to be measured in a distance measuring device based on laser interference, the cover is arranged on the measurement optical path with a small gap from the object so as not be in contact therewith. In addition, actual length measurement is sequentially and instantaneously performed while the object is moved at a predetermined speed. For this reason, an air current inevitably enters the cover through the gap as the object is moved in length measurement. In the second technique using the cover, an air current entering the cover through the gap may become a turbulent flow therein and reach the measurement optical path. Because of the lack of the consideration of such a turbulent flow in the cover, the second technique does not provide a sufficient effect of decreasing the fluctuation width of the optical path length. In addition, in order to prevent the cover from contacting the reflecting mirror, a special care, e.g., mounting a proximity sensor near the opening portion of the cover, is required.

In the method of detecting fluctuations in optical path length in advance, detection is a time-consuming operation. In addition, the cost of the device increases accordingly.

In a distance measuring device based on laser interference according to the present invention, a baffle structure member is arranged on the measurement optical path so that an air current on the measurement optical path becomes a laminar flow flowing in a predetermined direction with respect to the measurement optical path. A measurement error reducing (suppressing) effect based on such a laminar flow will be described below.

In general, while a fluid flows as a laminar flow, environmental parameters such as temperature, density, pressure, and composition at an arbitrary place in this flow do not change with time but remain constant. In this case, the direction of the flow does not change with time either, and each streamline becomes almost straight. The environmental parameters of the fluid along each streamline remain constant, and the respective streamlines are almost parallel.

In contrast to this, a spatially meandering flow is generally called a turbulent flow, along which environmental parameters at an arbitrary place randomly (irregularly) change with time. Also, the direction of the flow changes in the same manner. As is apparent, a laminar flow is incompatible with a turbulent flow. That is, the presence of a laminar flow will prevent occurrence of a turbulent flow.

Assume that a fluid (including a gas) is present in a space of a finite size, and the flow velocity is not zero. In this case, the fluid is present in the form of a laminar or turbulent flow. Whether the fluid is a turbulent or laminar flow can be determined by the magnitude of a dimensionless quantity called a Reynolds number representing the nature of a flow. A Reynolds number R is a value defined by expression (1) below using a cross-sectional size L of the flow, an average flow velocity V, and a kinematic coefficient $\mu$ of viscosity of the fluid as parameters:

$$R = L \cdot V / \mu \qquad (1)$$

It is known that the flow becomes a turbulent flow if the Reynolds number is larger than a certain critical value, and becomes a laminar flow if the Reynolds number is smaller than the critical value. As the critical Reynolds number for turbulent and laminar flows, the value obtained by the classical experiment by Reynolds is generally used.

According to the experiment, the critical Reynolds number is about 1,000. If $R > 1,000$, the flow becomes a turbulent flow. If $R < 1,000$, the flow becomes a laminar flow. Assume that the Reynolds number is zero. In a space of a finite size (the cross-sectional size L of the flow is not zero), this value corresponds to a state wherein the flow remains still (the average flow velocity V is zero). That is, no flow (laminar flow) is present.

The condition, therefore, for a flow to be a laminar flow is that the Reynolds number R satisfies inequality (2) below, except for the case wherein the Reynolds number is zero:

$$0 < R < 1000 \qquad (2)$$

The baffle structure member in the present invention is preferably set such that the Reynolds number R of a gas (fluid) on the measurement optical path satisfies inequality (2) above. As a result, an air current flows as a laminar flow in a predetermined direction with respect to the measurement optical path.

Assume that the gas (fluid) is air. In this case, with $\mu = 1.5 \times 10^{-1}$ (cm$^2 \cdot$s$^{-1}$) as the kinematic coefficient $\mu$ of viscosity, inequality (2) can be rewritten as inequality (3) below representing the relationship between the average flow velocity V (cm·s$^{-1}$) and the cross-sectional size L (cm) of the flow:

$$0 < L \cdot V < 1.5 \times 10^2 (\text{cm}^2 \cdot s^{-1}) \qquad (3)$$

According to this inequality, in order to make the air current flow as a laminar flow on the measurement optical path, some limitations must be imposed on the average flow velocity V and the cross-sectional size L of the flow. Whenever the product of these values satisfies inequality (3) above, a laminar flow is formed on the optical path.

As described above, while the air current is a laminar flow, the environmental parameters at an arbitrary place in the flow do not change with time. Even if the environmental parameters at the respective positions in the flow vary, and a nonuniform refractive index distribution (refractive index irregularity) is present in the flow, the refractive index irregularity does not change with time. If, therefore, an air current on the measurement optical path is a laminar flow, the optical path length does not fluctuate with time, and the fluctuation width of the optical path length is reduced even if a measurement beam passes through a space in which a refractive index irregularity is present.

According to the present invention, by producing a laminar flow on the measurement optical path using the baffle structure member, the fluctuations in optical path length are reduced, and measurement errors are suppressed.

Note that a predetermined air flow (or fluctuation) is generally present in the chamber of a stepper or the like. If, however, the baffle structure member of the present invention is arranged in the chamber, a laminar flow is produced in a space including the measurement optical path. Even if, for example, a gas flow partly becomes a laminar flow in the chamber owing to the air-conditioning means in the chamber, only a laminar flow is produced in the baffle structure member owing to this gas flow.

The baffle structure member preferably includes a cylindrical member which coaxially surrounds the measurement optical path, and a laminar flow is preferably produced in the cylindrical member. The cross-section of this cylindrical member limits the size of the cross-section of an air current on the measurement optical path, and preferably limits it to satisfy inequality (3) above.

The baffle structure member including this cylindrical member causes an air current in the cylindrical member to flow as a laminar flow flowing in a predetermined direction, i.e., a direction almost parallel to the axis of the cylindrical member. Since the axis of the cylindrical member is arranged to be almost parallel to the optical axis of a measurement beam, the measurement beam passes through the measurement optical path, in which the laminar flow flows, along a direction almost parallel to the laminar flow.

As described above, the measurement optical path is almost parallel to the laminar flow. In addition, the refractive index of the gas does not change with time at an arbitrary place in the laminar flow, and is uniform along the direction of the flow. That is, a measurement beam propagates along the space where the refractive index does not fluctuate. Therefore, the nonuniformity of refractive index at different places within a cross-section of the laminar flow has no influence on the measurement beam, and the optical path length hardly fluctuates with time. For the above reason, the fluctuation width of the optical path length is reduced.

If the baffle structure member is arranged in the chamber in this manner, the average flow velocity of the gas in the chamber need not be decreased, and the Reynolds number on the measurement optical path can be decreased by using a gas flow and the like in the chamber. A laminar flow therefore can be formed.

Assume that the cylindrical member of the baffle structure member has an expandable structure in the axial direction of the measurement optical path. In this case, even if the measurement distance (measurement optical path length) changes as the position of the object is displaced in the axis direction of the measurement optical path, the measurement optical path is always coaxially surrounded by the cylindrical member which expands/contracts in accordance with the measurement distance, and hence the laminar flow flowing in a predetermined direction in the cylindrical member is maintained. The measurement beam therefore keeps propagating along the space where the refractive index remains uniform and constant with time, and the fluctuation width of the optical path length is decreased.

If an air current inlet portion is formed in one of end portions of the cylindrical member, and an air current outlet portion is formed in the other end portion, the gas flowing outside the cylindrical member can be naturally taken into the cylindrical member through the air current inlet portion. In this case, the air current outside the cylindrical member can be efficiently taken into the cylindrical member by forming the air current inlet portion in one end portion of the cylindrical member, which is located on the upstream side of the external air current, and the air current outlet portion in the other end portion located on the downstream side in consideration of the direction of the external air current.

The taken gas flows as a laminar flow in the predetermined direction in the cylindrical member and is naturally discharged through the air current outlet portion. In this manner, the direction of a laminar flow with respect to the measurement optical path is stably set such that the gas flows from the air current inlet portion to the air current outlet portion. Since a laminar flow can be easily and stably formed in the cylindrical member in this manner, the fluctuation width of the optical path length can be effectively reduced.

In addition, the direction of a laminar flow with respect to the measurement optical path can be controlled in accordance with the positions of the inlet and outlet portions.

If an air supply unit for forcibly supplying an air current to the air current inlet portion is arranged in the chamber, a laminar flow which stably flows from the air current inlet portion to the air current outlet portion can be reliably formed. With this arrangement, the fluctuation width of the optical path length can be more effectively reduced.

Furthermore, an air current whose environmental parameters such as temperature, density, composition, and water vapor pressure are controlled can be supplied from the air supply unit into the cylindrical member. In this case, since the environmental parameter distribution within a cross-section of the laminar flow (cylindrical member) is equalized to some extent, the refractive index with respect to the measurement beam is equalized. For this reason, a laminar flow which remains stable for a longer period of time can be formed as compared with the case wherein the air current flowing outside the cylindrical member is naturally taken thereinto. Therefore, the fluctuation width of the optical path length can be more effectively reduced.

If the baffle structure member includes a pair of parallel plates for forming a parallel gap, and the measurement optical path extends through the parallel gap, the size of the cross-section of the air current on the measurement optical path is regulated by the size of the parallel gap (preferably regulated to satisfy inequality (3) above). For this reason, the air current becomes a straight laminar flow which flows in a predetermined direction in the parallel gap, i.e., a direction almost parallel to the flat surface of each plate.

Although the optical axis of the measurement beam is set to be almost parallel to the flat surface of each plate, the optical axis is not necessarily parallel to the direction of a laminar flow, and the measurement beam defines an arbitrary angle together with the direction of the laminar flow and crosses the laminar flow in a predetermined direction. Since a laminar flow is produced in the parallel gap when the air current flowing outside the parallel plates naturally enters the parallel gap, the angle defined by the direction of the laminar flow and the optical axis is dependent on the direction of the air current outside the parallel plates.

In general, the average direction of the air current outside the parallel plates does not change, and a turbulent flow component is attenuated immediately after it enters the parallel gap. For this reason, the direction of the laminar flow in the parallel gap remains constant, and the angle defined by the optical axis and the direction of the laminar flow does not change.

As described above, the refractive index of a gas may be uniform along the direction of a laminar flow, but may be nonuniform at different places in a cross-section of the laminar flow which is perpendicular to the flowing direction. For this reason, the refractive index distribution along the measurement beam defining an arbitrary angle together with the direction of the laminar flow may be nonuniform.

The refractive index of a gas, however, does not change with time at an arbitrary place in the laminar flow. Even if, therefore, such refractive index irregularity is present on the measurement optical path, length measurement is not affected. That is, the optical path length of the measurement beam does not change with time, and hence the fluctuation width of the optical path length is reduced.

Assume that the parallel plates are designed to be expandable in the axis direction of the measurement optical path. In this case, even if the measurement distance changes as the position of the object is displaced in the axial direction of the measurement optical path, the measurement optical path is always caused to extend through the parallel gap by the parallel plates which expand/contract in accordance with the measurement distance, and the laminar flow which flows in a predetermined direction in the parallel gap is maintained. Therefore, the measurement beam keeps propagating along a space where the refractive index remains constant with time, and the fluctuation width of the optical path length can be reduced.

First Embodiment

The present invention will be described in more detail below with reference to the first embodiment. FIG. 1 is a schematic view showing a distance measuring device based on laser interference according to the first embodiment, which is incorporated in an exposure apparatus (stepper) used for the manufacture of semiconductor elements. The device of this embodiment is constituted by a reflecting surface 12 of a reflecting mirror as an object, a beam splitter 14, and a cylindrical member 13 as a baffle structure member. All these components are arranged in an air-conditioned chamber (not shown).

A laser beam $B_1$ from a laser source (not shown) is split into a measurement beam $B_2$ and a reference beam $B_3$ by the beam splitter 14. The measurement beam $B_2$ propagates along a measurement optical path 15 and is reflected by the reflecting surface 12 to be incident on the beam splitter 14 again. Meanwhile, the reference beam $B_3$ is reflected by a reflecting mirror 50 arranged at a place which does not move with respect to the beam splitter 14. The reflected beam is incident on the beam splitter 14 again. The measurement beam $B_2$ and the reference beam $B_3$ incident on the beam splitter 14 emerge from the beam splitter 14 through one optical path 52. The measurement beam $B_2$ and the reference beam $B_3$ are incident on a detector (not shown), and the interference between the two beams $B_2$ and $B_3$ is detected by the detector. The moving distance of the reflecting surface 12 is measured on the basis of the detection data.

In FIG. 1, an HP 5527A Laser Position Transducer System is used as the distance measuring device containing the beam splitter 14 and the reflecting mirror 50, and excluding the cylindrical member 13.

The cylindrical member 13 coaxially surrounds the measurement optical path 15 of a light beam from the laser source. The measurement optical path 15 is formed in the space between the reflecting surface 12 and the beam splitter 14. The cylindrical member 13 is arranged between the reflecting surface 12 and the beam splitter 14 with certain gaps therefrom such that the two end opening portions of the cylindrical member 13 are not in contact with the reflecting surface 12 and the beam splitter 14. The gaps at the two ends also serve as an opening for taking an air current into the cylindrical member 13 and an opening for discharging the air current, respectively. With these gaps, an air current produced outside the cylindrical member 13 by an air-conditioning operation can be naturally taken into the cylindrical member 13, i.e., onto the measurement optical path 15.

The cylindrical member 13 as a baffle structure member is designed to limit the size of the cross-section of the air current on the measurement optical path 15 with the cross-section (inner radius) of the cylindrical member 13 so as to cause the gas in the cylindrical member 13 to form a laminar flow flowing in the axis direction of the cylindrical member 13. That is, the inner diameter of the cylindrical member 13 is set in accordance with a cross-section size L of the flow which satisfies inequality (3) to satisfy inequality (3) in accordance with an average flow velocity V of an air current produced by an air-conditioning operation. If, for example, the average flow velocity V of the air current is V=30 cm/s, (0<) L<5 is obtained as a condition for the inner radius L of the cylindrical member 13.

The velocities of air currents naturally entering the cylindrical member 13 through the two end opening portions are lower than the velocities of air currents outside the cylindrical member 13. For this reason, if the cylindrical member 13 has a radius of 5 cm or less, a laminar flow flows in the cylindrical member 13. In order to cause a laminar flow to cover the entire measurement optical path 15, the size of each of the gaps at the two ends of the cylindrical member 13 may be set to be equal or smaller than the inner radius of the cylindrical member 13. If gaps are excessively large, the air current may become a turbulent flow at portions (the gap portions) on the measurement optical path 15.

The cylindrical member 13 having the above arrangement has a function of taking an external air current thereinto through one of the gaps at the two ends and causing the air current to flow as a laminar flow in the axis direction on the overall measurement optical path 15. The baffle structure member is not limited to the cylindrical member. For example, an elliptic cylindrical member, or a prismical member (e.g., a triangular or quadrangular prismical member) may be used as long as it has the same function as that described above.

Figure 2:
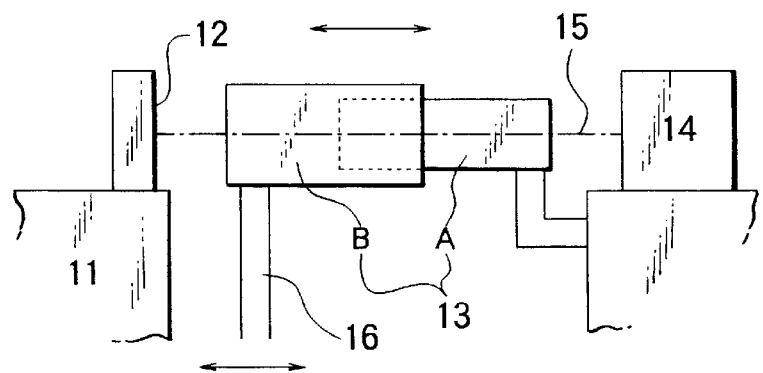
FIGS. 2 and 3 are views each showing a baffle structure member having an expandable structure.

The cylindrical member 13 as a baffle structure member preferably has a structure expandable in the axial direction. For example, the cylindrical member 13 may have a double-cylinder structure in which two cylindrical members having slightly different inner and outer diameters are fitted together. As shown in FIG. 2, a cylindrical member A is fixed on the beam splitter 14 side, and a cylindrical member B is arranged on the reflecting surface 12 side, located on the extended line of the beam splitter 14, to be movable in the axial direction of the measurement optical path. A driving mechanism 16 and its control mechanism (not shown) are connected to the cylindrical member B. If the cylindrical member B moves while maintaining the overlapping portion with the cylindrical member A, the overall length of the cylindrical member 13 changes.

The movement of the cylindrical member B is controlled through the driving mechanism 16, and corresponds to the movement of the reflecting surface 12 fixed on a moving stage 11 in the axial direction of the optical path 15. That is, the movement of the cylindrical member B is always controlled to be the same as that of the moving stage 11 in the optical axis direction in terms of moving distance, direction, and timing. For this reason, the opening portion of the cylindrical member B is not brought into contact with the reflecting surface 12, and a predetermined distance (gap) is always be maintained therebetween.

The expandable structure is not limited to such a double-cylinder structure. For example, a multi-stage mirror barrel structure, a volute spring structure, or a spiral tube structure may be used. With such a structure, even if the length (measurement distance) of the measurement optical path 15 changes, the length of the cylindrical member 13 changes accordingly to always coaxially surround the measurement optical path 15.

In each of these embodiments, the beam splitter 14 is fixed on the fixing base of the device, splits a light beam from the laser source into at least two light beams, guides one of the light beams onto the reflecting surface 12, and perpendicularly irradiates it on the reflecting surface 12. The reflecting surface 12 reflects the light beam perpendicularly irradiated by the beam splitter 14 in a direction to return it to the beam splitter 14 along the same measurement optical path 15. This optical path through which a light beam reciprocates is the measurement optical path 15.

The reflecting surface 12 is the reflecting surface of a reflecting mirror fixed on one end side on the moving stage 11 which is holding a semiconductor wafer (not shown) on its upper surface. Since a stage driving mechanism and its control mechanism (neither of which are shown) are connected to the moving stage 11, when the moving stage 11 is displaced, the reflecting surface 12 is also displaced in the axial direction of the measurement optical path 15. When the position of the reflecting surface 12 is displaced with respect to the fixed beam splitter 14, the length, i.e., the measurement distance, of the measurement optical path 15 changes.

As described above, since the expansion/contraction of the cylindrical member 13 and the displacement of the moving stage 11 always occur by the same distance, in the same direction, and at the same timing, the length of the cylindrical member 13 changes in accordance with a change in measurement distance. Therefore, the measurement optical path 15 is always coaxially surrounded by the cylindrical member 13.

The position of the moving stage 11 is measured by using the above distance measuring device based on laser interference to move a semiconductor wafer (not shown) placed on the stage 11 to a target position for exposure. In this case, in order to efficiently perform a wafer positioning operation, stage position measurement is sequentially performed while the moving stage 11 is moved. During this operation, a laminar flow flowing on the measurement optical path 15 in its axial direction is maintained. That is, the measurement beam is maintained along the space where the refractive index does not change, and hence the fluctuation width of the optical path length in length measurement can be reduced. Therefore, the positioning precision increases.

The distance measuring device based on laser interference according to each of these embodiments was arranged in an air-conditioned chamber in which the temperature was controlled, and fluctuations in optical path length were continuously measured while the length of the measurement optical path (the distance between the beam splitter 14 and the reflecting surface 12) was fixed to 24 cm. The measurement result will be described below. The average flow velocity of an air current produced by an air-conditioning operation in the chamber was about 40 cm/s.

Figure 4:
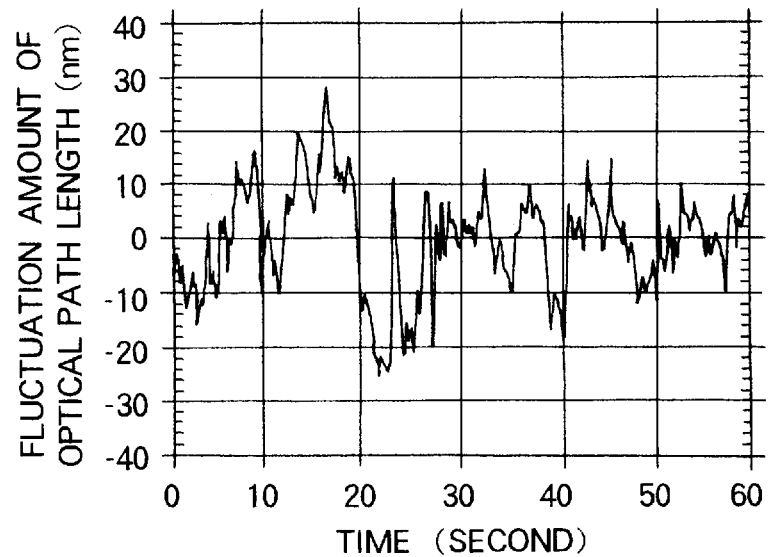
FIG. 4 is a graph showing the fluctuation amount of the optical path length in a case wherein no baffle structure member is arranged on the measurement optical path.

For comparison, FIG. 4 shows a result obtained under the above measurement conditions without any baffle structure member on the measurement optical path. The ordinate represents the measured value (indicating a fluctuation with respect to a set value of 0) of the length of the measurement optical path; and the abscissa, the elapsed time. The average amplitude (fluctuation width) was 9.6 nm.

Figure 5:
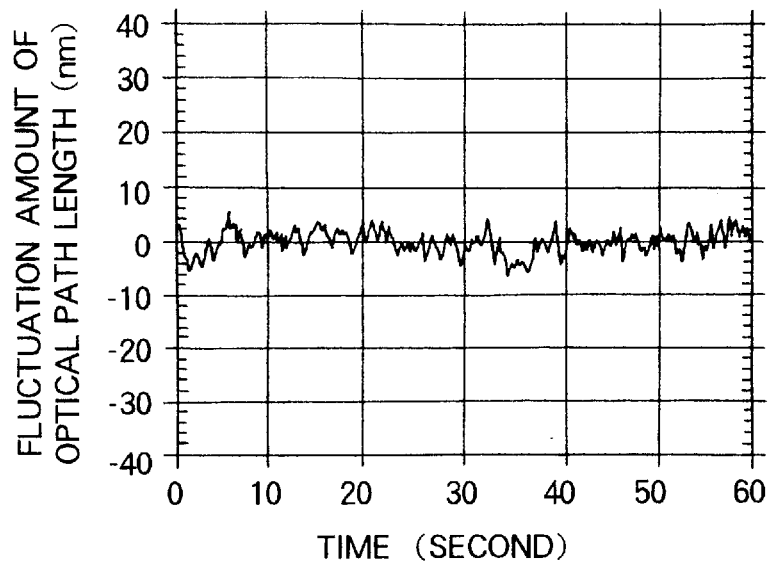
FIG. 5 is a graph showing the fluctuation amount of the optical path length in a case wherein the baffle structure member of the first embodiment is arranged on the measurement optical path.

The cylindrical member 13 as a baffle structure member according to the first embodiment was arranged on the measurement optical path 15, and fluctuations in optical path length were continuously measured. FIG. 5 shows the measurement result. The diameter of the cylindrical member 13 was 1.6 cm. Gaps of 1.0 cm were respectively ensured between the cylindrical member 13 and the beam splitter 14 and between the cylindrical member 13 and the reflecting surface 12.

The above measurement was performed under the same condition by using the same optical system as in the measurement in FIG. 4. Referring to FIG. 5, the ordinate represents the measured value (indicating a fluctuation with respect to a set value of 0) of the length of the measurement optical path; and the abscissa, the elapsed time. The average amplitude was 2.2 nm. That is, the average amplitude can be reduced to about ⅓ that in the case wherein no baffle structure member is used.

An air current produced outside the cylindrical member 13 by an air-conditioning operation is expected to flow as a turbulent flow in consideration of the flow velocity and the spread (several 10 cm) of the space. The velocity of an air current in the chamber is difficult to decrease because of the limitations imposed on the minimum value by the performance of a dustproof filter and the cooling performance.

In contrast to this, in this embodiment, the cylindrical member 13 as a baffle structure member is arranged in a space where an air current produced by an air-conditioning operation is present to cause the air current naturally taken into the driving mechanism 16 through the gaps at the two ends to flow as a laminar flow. With this arrangement, even if a turbulent flow or refractive index irregularity is present in the chamber, the overall measurement optical path 15 is free from their influences. For this reason, the fluctuation width of the optical path length to be measured can be reduced.

As described above, according to this embodiment, the fluctuation width of the optical path length can be easily reduced by only using an air current present in the air-conditioned chamber and properly designing the inner diameter of the cylindrical member 13.

In addition, the baffle structure member of this embodiment has a simple structure, and the device can be easily improved while an increase in cost is suppressed. Furthermore, since measurement errors can be greatly reduced, this embodiment can contribute to ultra-high-precision length measurement. If, therefore, this device is applied to a stepper or the like, high-precision positioning or transfer/exposure can be efficiently performed.

Since gaps are ensured at the two ends of the cylindrical member 13, the moving stage 11 can be moved with high precision without being interfered with. In addition, since the gaps are sufficiently large, a mechanism for causing the cylindrical member 13 to expand/contract while maintaining a noncontact state with the moving stage 11 can be easily arranged.

Second Embodiment

Figure 6:
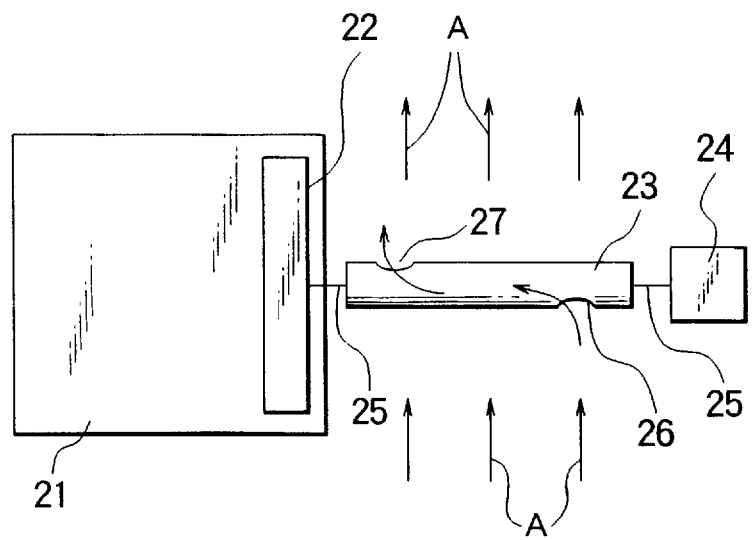
FIG. 6 is a plan view showing a distance measuring device based on laser interference according to the second embodiment of the present invention, which is incorporated in an exposure apparatus used for the manufacture of semiconductor elements.

FIG. 6 is a plan view schematically showing the second embodiment. The second embodiment is a distance measuring device based on laser interference, which is incorporated in a moving stage 21 of a stepper like the one in the first embodiment. The device of this embodiment is constituted by a reflecting surface 22 of a reflecting mirror as an object, a beam splitter 24, and a cylindrical member 23 as a baffle structure member. All these components are arranged in an air-conditioned chamber (not shown).

The cylindrical member 23 of this embodiment coaxially surrounds a measurement optical path 25 which is formed in the space between the reflecting surface 22 and the beam splitter 24 when a light beam from a laser source (not shown) is guided to the space. The two end opening portions of the cylindrical member 23 are arranged so as not be in contact with the reflecting surface 22 and the beam splitter 24.

In FIG. 6, the HP 5527A Laser Position Transducer System is used as the distance measuring device containing the beam splitter 24, and excluding the cylindrical member 23.

Figure 3:
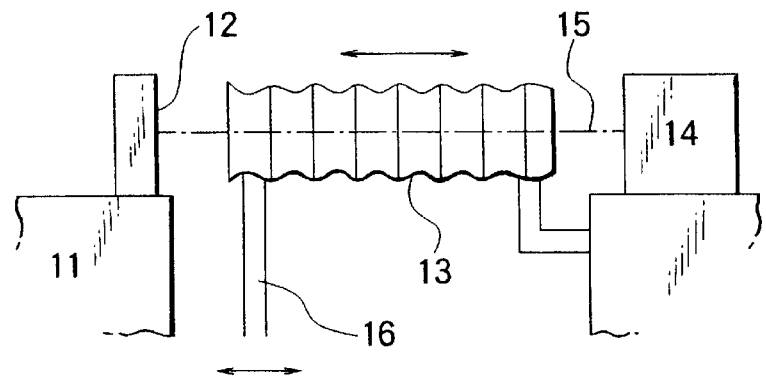

The cylindrical member 23 of this embodiment has an inner radius which satisfies inequality (3) as in the first embodiment, and a structure expandable in the axial direction as shown in FIG. 2 or 3. In addition, the cylindrical member 23 has an air current inlet portion 26 in one end portion, and an air current outlet portion 27 in the other end portion.

Each of the inlet and outlet portions 26 and 27 has a size almost equal to smaller than the inner diameter of the cylindrical member 23, and is preferably formed into a smooth shape (e.g., a circular shape with a rounded edge) so as not to disturb an air current. The inlet and outlet portions 26 and 27 are arranged to efficiently take an air current produced outside the cylindrical member 23 by an air-conditioning operation thereinto and efficiently discharge the air current therefrom in accordance with the direction of the air current.

More specifically, in this embodiment, since an air current near the measurement optical path 25 in the air-conditioned chamber flows upwards as indicated by an arrow A, the air current inlet portion 26 is arranged to face the upstream direction of this air current, and the air current outlet portion 27 is arranged to face the downstream direction of the air current.

The air current produced by the air-conditioning operation therefore is naturally and efficiently taken into the cylindrical member 23, i.e., onto the measurement optical path 25, through the air current inlet portion 26. In the cylindrical member 23, a stable laminar flow is produced in a direction along the axis of the cylindrical member 23 to flow from the air current inlet portion 26 to the air current outlet portion 27. The air current is then naturally discharged through the air current outlet portion 27.

Since the baffle structure member of this embodiment includes the cylindrical member 23 and the inlet and outlet portions 26 and 27, even if the measurement distance changes, a laminar flow can be easily and stably produced in the axial direction on the measurement optical path 25 in accordance with this change. Therefore, the measurement beam remains along the space where the refractive index does not change. As a result, the fluctuation width of the optical path length in length measurement can be effectively reduced, and the positioning precision increases.

The direction of a laminar flow with respect to the measurement optical path can be controlled by changing the positions of the inlet and outlet portions 26 and 27.

Figure 7:
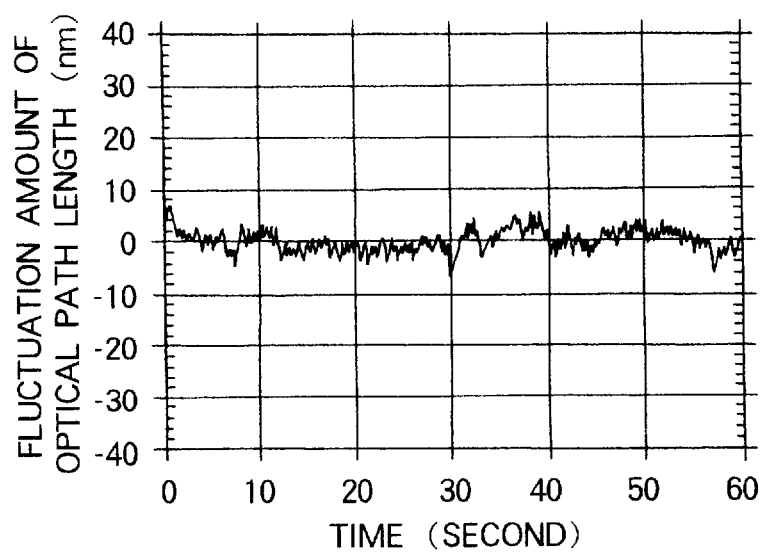
FIG. 7 is a graph showing the fluctuation amount of the optical path length in a case wherein the baffle structure member of the second embodiment is arranged on the measurement optical path.

The cylindrical member 23 as the baffle structure member of the second embodiment was arranged on the measurement optical path 25, and fluctuations in optical path length were continuously measured. FIG. 7 shows the measurement result. Similar to the first embodiment, the diameter of the cylindrical member 23 was 1.6 cm, and spaces of 0.1 cm were respectively ensured between the cylindrical member 23 and the beam splitter 24 and between the cylindrical member 23 and the reflecting surface 22. The diameter of each of the air current inlet portion 26 and the air current outlet portion 27 was 1.4 cm. The central position of each of the inlet and outlet portions was 1.2 cm away apart from a corresponding opening portion of the cylindrical member 23.

The above measurement was performed under the same condition by using the same optical system as in the measurement in FIG. 4. Referring to FIG. 7, the ordinate represents the measured value (indicating a fluctuation with respect to a set value of 0) of the length of the measurement optical path; and the abscissa, the elapsed time. The average amplitude was 2.1 nm. That is, the average amplitude can be reduced to about ⅕ that in the case wherein no baffle structure member is used.

As described above, the fluctuation width of the optical path length can be easily reduced by only using an air current present in the air-conditioned chamber and properly designing the inner radius of the cylindrical member 23 and the inlet and outlet portions 26 and 27. For this reason, high-precision length measurement can be performed at a low cost.

Third Embodiment

Figure 8:
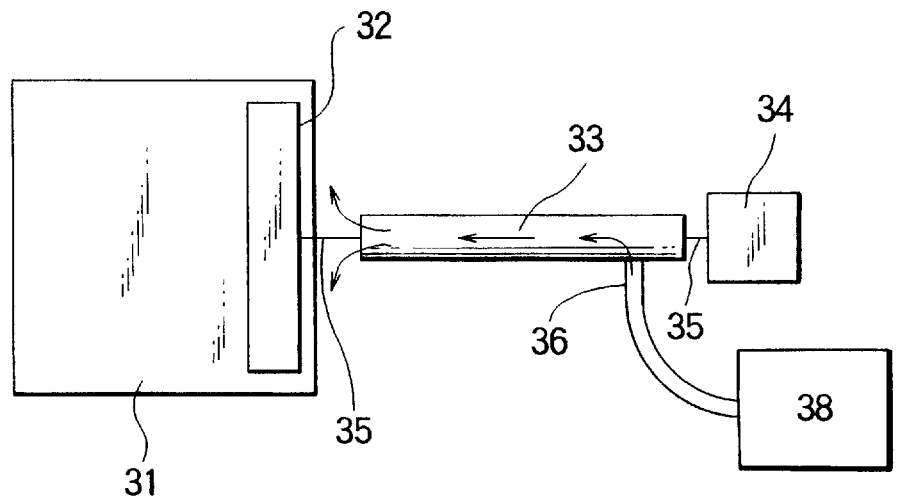
FIG. 8 is a plan view showing a distance measuring device based on laser interference according to the third embodiment of the present invention, which is incorporated in an exposure apparatus used for the manufacture of semiconductor elements.

FIG. 8 is a plan view schematically showing a distance measuring device based on laser interference according to the third embodiment of the present invention. This device is incorporated in a moving stage 31 of a stepper like the one in the first embodiment. The device of this embodiment is constituted by a reflecting surface 32 of a reflecting mirror as an object, a beam splitter 34, and a cylindrical member 33 as a baffle structure member. All these components are arranged in an air-conditioned chamber (not shown).

The cylindrical member 33 of this embodiment coaxially surrounds a measurement optical path 35 which is formed in the space between the reflecting surface 32 and the beam splitter 34 when a light beam from a laser source (not shown) is guided to the space. The two end opening portions of the cylindrical member 23 are arranged so as not be in contact with the reflecting surface 32 and the beam splitter 34.

In FIG. 8, the HP 5527A Laser Position Transducer System is used as the distance measuring device containing the beam splitter 34, and excluding the cylindrical member 33.

The cylindrical member 33 of this embodiment has an inner radius which satisfies inequality (3) as in the first embodiment, and a structure expandable in the axial direction as shown in FIG. 2 or 3. In addition, the cylindrical member 23 has an air current inlet portion 36 in one end portion, and an air current outlet portion 37 in the other end portion. This device further includes an air supply unit 38 for forcibly supplying an air current into the air current inlet portion 36.

The air supply unit 38 is constituted by an electric fan, a pump, a fan, or the like arranged outside the device. The supplied air forms a stable laminar flow in a direction along the axis of the cylindrical member 33 which extends to the other end opening portion of the cylindrical member 33. The laminar flow is then discharged from the cylindrical member 33 through the other end opening portion of the cylindrical member 33. In this case, the velocity of the air current is preferably equal to the velocity of the air current produced by the air-conditioning operation in the device.

As described above, since the baffle structure member of this embodiment is constituted by the cylindrical member 33 and the air supply unit 38 arranged at the air current inlet portion 36, even if the measurement distance changes, a stable laminar flow can be reliably formed on the measurement optical path 35 in the axial direction in accordance with this change. Therefore, the measurement beam remains along the space where the refractive index does not change. As a result, the fluctuation width of the optical path length in length measurement can be effectively reduced, and the positioning precision increases.

If the air supply unit 38 has a means for controlling air current conditions, an air current whose environmental parameters such as temperature, density, composition, and water vapor pressure are controlled can be supplied into the cylindrical member 33. Assume that an air current having a constant temperature is to be supplied into the cylindrical member 33. In this case, if a long metal pipe extending outside the device through the air current inlet portion 36 is used, the temperature of the air current becomes equal to that of the metal pipe.

As described above, when an air current having a constant environmental parameter is to be supplied into the cylindrical member 33, the refractive index with respect to the measurement beam is equalized. This allows the formation of a laminar flow which is stable for a long period of time as compared with the case wherein an air current flowing outside the cylindrical member 33 is naturally taken thereinto. Therefore, the fluctuation width of the optical path length can be more effectively reduced, and the optical path length can be stably measured.

In addition, discharging of an air current outside the device through the current air outlet portion may be forcibly performed as well as supply of an air current. In this case, the stability of the laminar flow in the cylindrical member 33 further improves to more effectively reduce the fluctuation width of the optical path length.

Fourth Embodiment

Figure 9:
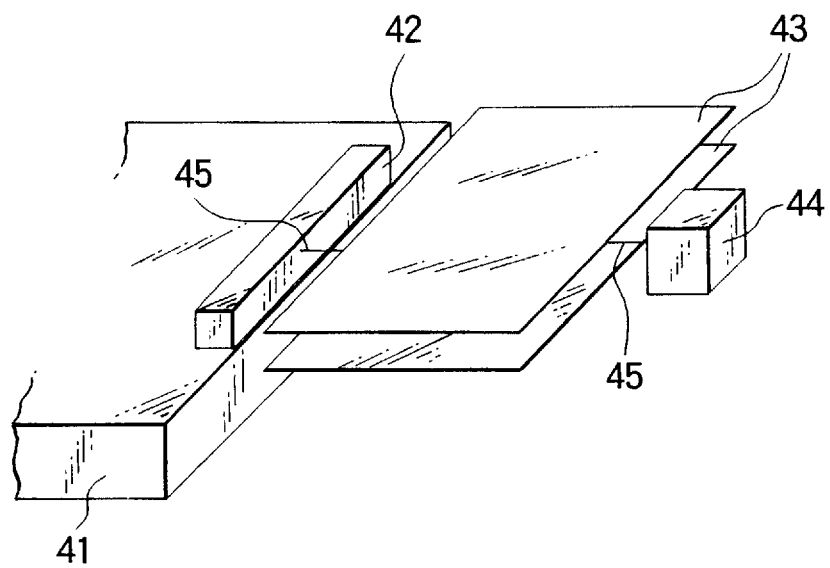
FIG. 9 is a perspective view showing the schematic arrangement of a distance measuring device based on laser interference according to the fourth embodiment of the present invention, which is incorporated in an exposure apparatus used for the manufacture of semiconductor elements.

FIG. 9 is a schematic view showing a distance measuring device based on laser interference according to the fourth embodiment of the present invention, which is incorporated in an exposure apparatus (stepper) used for the manufacture of semiconductor elements. The device of this embodiment is constituted by a reflecting surface 42 of a reflecting mirror as an object, a beam splitter 44, and a pair of flat plates 43 serving as a baffle structure member. All these components are arranged in an air-conditioned chamber (not shown).

In FIG. 9, the HP 5527A Laser Position Transducer System is used as the distance measuring device containing the beam splitter 44, and excluding the pair of the flat plates 43.

The pair of flat plates 43 define a parallel gap, which is open in four directions. An air current produced by an air-conditioning operation and flowing outside the flat plates 43 is naturally taken into the parallel gap. The pair of flat plates 43 serving as a baffle structure member are designed to limit the size of the cross-section of the taken air current to be smaller in one direction with the distance (gap) between the plates so as to cause the air current in the parallel gap to form a straight laminar flow flowing in a direction almost parallel to the flat surface of each plate.

The pair of the flat plates 43 are designed such that the distance therebetween corresponds to the cross-sectional size L of a flow and satisfies inequality (3) in accordance with an average flow rate V of an air current produced by an air-conditioning operation. If, for example, the average flow rate V is V=30 cm/s, (0<) L<5 cm is obtained as a condition for a distance L between the pair of flat plates 43.

A measurement optical path 45 is formed in the space between the reflecting surface 42 and the beam splitter 44 when a light beam from a laser source (not shown) is guided to the space. The measurement optical path 45 extends through the parallel gap between the pair of flat plates 43 to be almost parallel to the flat surface of each plate. Referring to FIG. 9, the pair of flat plates 43 sandwich the measurement optical path 45 in the vertical direction. However, the sandwiching direction is not limited to this direction. For example, the measurement optical path 45 may be sandwiched between the plates in the horizontal or oblique direction.

With this arrangement, a laminar flow formed by using an air current flowing outside the flat plates 43 and naturally entering the parallel gap flows on the measurement optical path 45 with an arbitrary angle with respect to the direction of the measurement optical path 45. That is, the angle defined by the flowing direction of the laminar flow and the measurement optical path 45 may take 0° to 90° depending on the direction of an air current flowing outside the flat plates 43. The laminar flow therefore crosses the measurement optical path 45.

The average direction of an air current flowing outside the flat plates 43 hardly changes, and a turbulent flow component is attenuated immediately after it enters the parallel gap.

For this reason, the flowing direction of the laminar flow remains constant.

In this case, the refractive index distribution on the measurement optical path 45 may be nonuniform reflecting a nonuniform environmental parameter distribution within a cross-section of the laminar flow which is perpendicular to the flowing direction. However, since the refractive index of a gas does not change with time at an arbitrary place in a laminar flow, such refractive index irregularity becomes constant with time. Even if this irregularity is present on the measurement optical path 45, the overall measurement optical path undergoes no change. Therefore, length measurement is not affected by such irregularity. That is, the optical path length (change or error) of the measurement optical path 45 does not change with time, and hence the fluctuation width of the optical path length can be reduced.

Figure 10:
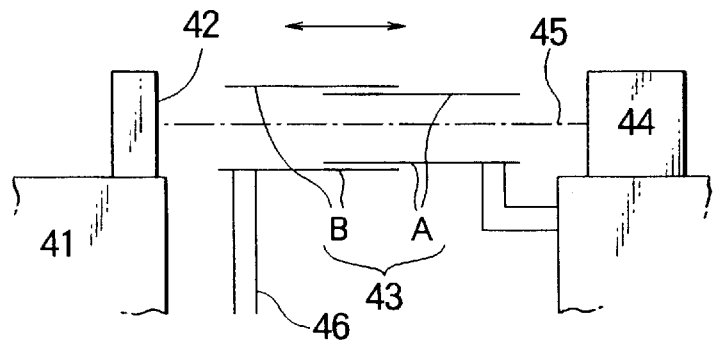
FIGS. 10 and 11 are views each showing a baffle structure member consisting of two pairs of flat plates and having an expandable structure.

The pair of flat plates 43 has a structure expandable in the axial direction of the measurement optical path 45. Consider a duplex structure in which two pairs of plates respectively having slightly different gaps are fitted together. As shown in FIG. 10, flat plates A are fixed on the beam splitter 44 side, and flat plates B are arranged on the reflecting surface 42 side on the extended line of the beam splitter 44 in such a manner that a driving mechanism 46 and its control mechanism (not shown) are connected to the flat plates B to allow them to move in the axial direction of the measurement optical path 45. If the flat plates B move while maintaining the overlapping portion with the flat plates A, the overall dimension of the pair of flat plates 43 increases/decreases in the measurement optical path direction.

The movement of the flat plates B is controlled through the driving mechanism 46 to correspond to the movement of the reflecting surface 42 fixed on a moving stage 41. That is, the flat plates B and the moving stage 41 are always moved by the same distance, in the same direction, and at the same timing. The flat plates B therefore are not brought into contact with the reflecting surface 42, and the gaps therebetween are always kept constant.

Figure 11:
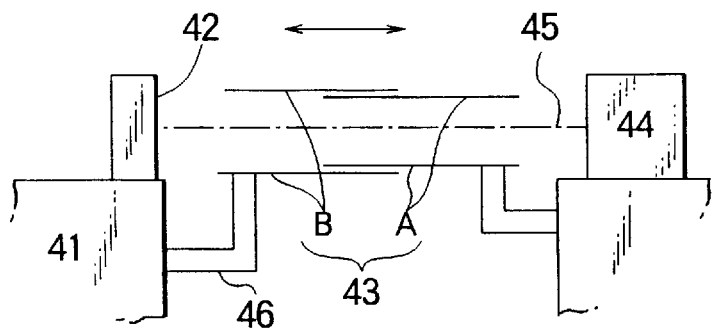

In the structure in which the two pairs of flat plates A and B are combined in this manner, the flat plates B on the reflecting surface 42 side may be fixed to the moving stage 41, on which the reflecting surface 42 is mounted, through a support member 46, as shown in FIG. 11. In this case, predetermined distances between the flat plates B and the reflecting surface 42 are maintained, and hence the flat plates B and the reflecting surface 42 are not brought into contact with each other. With this arrangement, the flat plates B and the moving stage 41 move at the same time, while the overlapping portions with the flat plates A are maintained. Therefore, the overall dimension of the pair of flat plates 43 increases/decreases in the measurement optical path direction. In this case, neither a driving mechanism nor a driving means for causing the plates to expand/contract is required.

Referring to FIGS. 10 and 11, the reflecting surface 42 is arranged at one end of the measurement optical path 45. When the reflecting surface 42 (moving stage 41) is displaced with respect to the fixed beam splitter 44 in the axial direction of the measurement optical path 45, the length of the measurement optical path 45 changes, and the dimension of the pair of flat plates 43 changes accordingly.

With this structure, even if the length (measurement distance) of the measurement optical path 45 changes, the measurement optical path 45 is always allowed to extend through the parallel gap because the dimension of the flat plates 43 changes in accordance with the measurement distance. The above laminar flow is kept flowing on the measurement optical path 45. Therefore, the measurement beam is kept in the space where the refractive index does not change with time, and the fluctuation width of the optical path length can be reduced.

Figure 12:
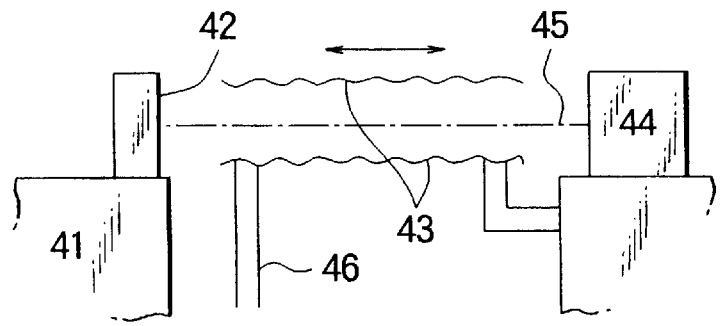
FIG. 12 is a view showing a baffle structure member having a bellows structure.

As an expandable structure, the duplex structure in which the two pairs of flat plates having slightly different distances are fitted together has been described. However, the expandable structure is not limited to the duplex structure. For example, plates 43 having bellows structures like those shown in FIG. 12 may be used. With the bellows structures, the bellows portions are controlled through the driving mechanism 46 to expand/contract in accordance with a change in measurement distance. Therefore, the same effects as those described above can be obtained.

In general, distance measurement is sequentially performed using the above distance measuring device based on laser interference, while the moving stage 41 is moved to move a semiconductor wafer (not shown) to a target position for exposure. Even in this operation, the laminar flow flowing on the measurement optical path 45 in the axial direction is maintained. That is, the measurement beam remains along the space where the refractive index does not change, and hence the fluctuation width of the optical path length can be reduced. Therefore, the positioning precision increases.

An air current produced outside the pair of flat plates 43 by an air-conditioning operation is expected to flow as a turbulent flow in consideration of the flow velocity and the spread (several 10 cm) of the space. However, since the pair of flat plates 43 serving as a baffle structure member is arranged in the air current, an air current naturally taken into the pap between the flat plates 43 becomes a laminar flow. For this reason, even if refractive index irregularity or the like is present, the fluctuation width of the optical path length can be reduced without being influenced by such irregularity.

Figure 13:
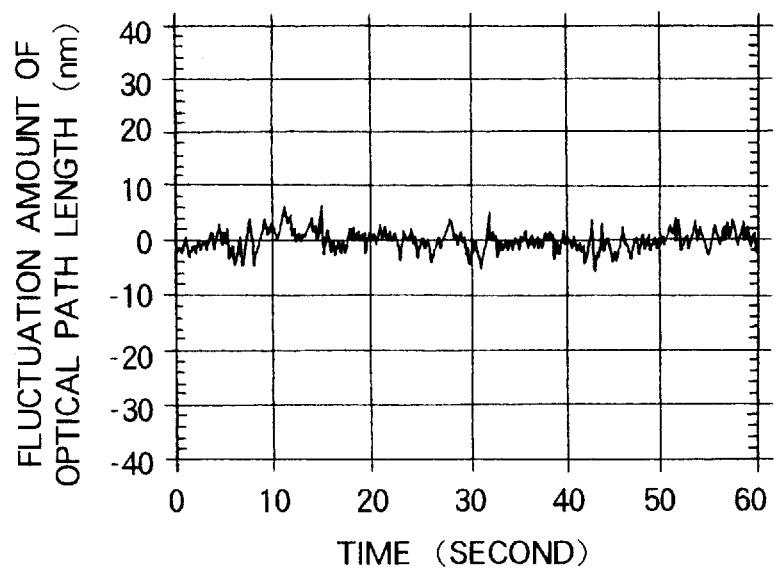
FIG. 13 is a graph showing the fluctuation amount of the optical path length in a case wherein the baffle structure member of the fourth embodiment is arranged on the measurement optical path.

The pair of flat plates 43 serving as the baffle structure member of this embodiment were arranged on the measurement optical path 45, and fluctuations in optical path length were continuously measured. FIG. 13 shows the measurement result. The distance between the pair of flat plates 43 was 1.0 cm, and each flat plate had a size of 23.8 cm (the dimension along the measurement optical path) ×21.5 cm (the length of a side perpendicular to the measurement optical path).

The above measurement was performed under the same condition by using the same optical system as in the measurement in FIG. 4. Referring to FIG. 13, the ordinate represents the measured value (indicating a fluctuation with respect to a set value of 0) of the length of the measurement optical path 45; and the abscissa, the elapsed time. The average amplitude was 1.9 nm. That is, the average amplitude can be reduced to about $\frac{1}{5}$ that in the case wherein no baffle structure member is used.

According to this embodiment, the fluctuation width of the optical path length can be easily reduced by only using an air current inside the air-conditioned chamber and properly designing the distance between the flat plates 43 and the like. The embodiment has a simple structure and can greatly reduce measurement errors. Therefore, the embodiment contributes to an ultra-high-precision length measurement.

Since the flat plates 43 are arranged with certain gaps, the plates can be easily detached when position measurement is not required, e.g., when maintenance of the stage, the step movement of the stage, or replacement of a mask or wafer is performed. That is, the flat plates 43 do not become obstacles. In addition, since gaps are ensured between the baffle structure member and the reflection mirror and the like (noncontact), no external vibrations are transferred to the moving stage side through the baffle structure member to decrease the positioning precision of the stage.

In this embodiment, the pair of flat plates 43 are arranged to sandwich the measurement optical path 45. However, the space around measurement optical path in the stepper may be designed in consideration of limitations associated with the Reynolds number so as to be used as a baffle structure member.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 243453/1994 (6-243453) filed on Sep. 13, 1994, is hereby incorporated by reference.

What is claimed is:

1. A distance measuring device based on laser interference, comprising:

a beam splitter for splitting an incident laser beam into a measurement beam and a reference beam, the measurement beam being irradiated, through a gas, onto an object whose moving distance is to be measured;

a reflecting mirror fixed to the object and having a reflecting surface for reflecting the measurement beam, the measurement beam from said reflecting mirror being used to measure the moving distance of the object on the basis of interference between the measurement beam and the reference beam; and two flat plates arranged between said beam splitter and said reflecting mirror and in a space where the gas flows, said two flat plates allowing the measurement beam to pass therebetween, the measurement beam passing through the gas present between said two flat plates, a Reynolds number $R = L \cdot V / \mu$ being less than 1,000, where L is a distance between said two flat plates, V is an average flow velocity of the gas between said two flat plates, and $\mu$ is a kinematic coefficient of viscosity of the gas, and the gas flowing parallel to said two flat plates.

2. A device according to claim 1, wherein said two flat plates respectively comprise a first flat plate remaining still with respect to said beam splitter and a second flat plate which moves together with said reflecting mirror.

3. A device according to claim 1, wherein said two flat plates respectively comprise a first portion remaining still with respect to said beam splitter, a second portion which moves together with said reflecting mirror, and a portion having a flexible structure for connecting the first and second portions.

4. A distance measuring device based on laser interference, comprising:

a beam splitter for splitting an incident laser beam into a measurement beam and a reference beam, the measurement beam being irradiated, through a gas, onto an object whose moving distance is to be measured;

a reflecting mirror fixed to the object and having a reflecting surface for reflecting the measurement beam, the measurement beam from said reflecting mirror being used to measure the moving distance of the object on the basis of interference between the measurement beam and the reference beam;

a pipe arranged between said beam splitter and said reflecting mirror, said pipe allowing the measurement beam to pass therethrough, the measurement beam passing through the air present in said pipe, a Reynolds number $R = L \cdot V/\mu$ being less than 1,000, where L is an inner radius of said pipe, V is an average flow velocity of the gas in said pipe, and $\mu$ is a kinematic coefficient of viscosity of the gas, and the gas in said pipe flowing parallel to the measurement beam; and a gas supply unit for forcibly supplying the gas into said pipe.

5. A device according to claim 4, wherein said pipe comprises a first pipe remaining still with respect to said beam splitter and a second pipe which moves together with said reflecting mirror.

6. A device according to claim 4, wherein said pipe comprises a first portion remaining still with respect to said beam splitter, a second portion which moves together with said reflecting mirror, and a portion having a flexible structure for connecting the first and second portions.

7. A device according to claim 4, wherein a temperature of the gas supplied into the pipe is controlled to a predetermined value.

8. A measuring apparatus by laser interferometry for performing the measurement based on a coherent light between a distance measuring light and a reference light which are emitted from a laser source, said apparatus comprising:

a baffle structure member surrounding an optical path on which a laser beam emitted from the laser source passes; and gas suppler for making a gas flow in a space in said baffle structure, a Renolds number $R = L*V/\mu$ in the flow gas being less than 1000, wherein L is an inner size of said baffle structure member, V is an average flow velocity of the flow gas between said two flat plates, and $\mu$ is a kinematic coefficient of viscosity of the gas, and the gas flows in parallel to said optical path of the laser light.

9. An apparatus according to claim 8, further comprising:

a beam spitter for dividing the coherent light into said distance measuring light and said reference light so that said distance measuring light passes in the gas to be projected to an object of which moving distance should be measured; and a reflection mirror fixed on said object and having a reflecting surface for reflecting said distance measuring light.

10. An apparatus according to claim 8, wherein said baffle structure member comprises two parallel plates.

11. An apparatus according to claim 8, wherein said baffle structure member comprises a pipe.

* * * * *